Aug. 26, 1947.                L. L. YOUNG                    2,426,424
                        METER MOUNTING DEVICE
                         Filed July 30, 1942
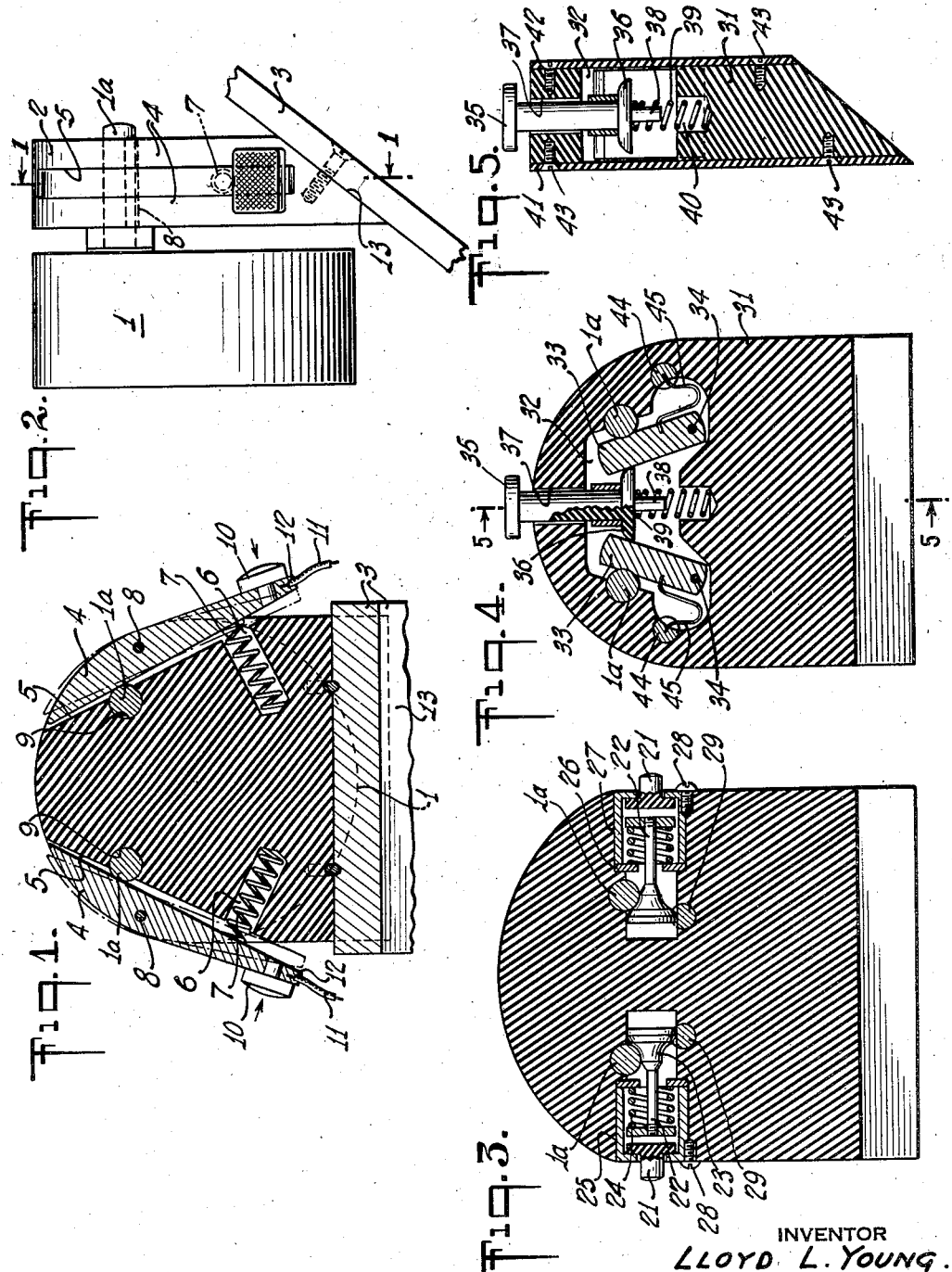
INVENTOR
LLOYD L. YOUNG.
BY
ATTORNEY Patented Aug. 26, 1947

2,426,424

UNITED STATES PATENT OFFICE 2,426,424

METER MOUNTING DEVICE

Lloyd L. Young, Patchogue, N. Y., assignor to Radio Corporation of America, a corporation of Delaware Application July 30, 1942, Serial No. 452,839

4 Claims. (Cl. 173—328)

This new invention relates to a new and useful meter mounting, and more particularly to the attachment of the meter to electrical circuits.

An object of this invention is to provide a novel device for quickly inserting or removing a meter from an electrical circuit.

Another object of this invention is to provide a device for supporting a meter at a convenient angle to facilities quick reading.

Still another object of this invention is to provide an inexpensive meter mounting having tension release members for manual operation of the electrical connections which has particular merit in the testing of "bread-board" circuits because of the time and patience saved by its use.

A feature of this invention is the mounting of a meter on a block which forms a support for the meter, the block being provided with convenient tension release members for manual operation of the detachable electrical connections.

Prior art practice has been to attach an electrical conductor, as a wire, to each terminal of the meter by means of threaded nuts and washers, the conductors being parts of the electric circuit.

In the Laboratory, experimental circuits are often of a temporary character, and it frequently happens that electric meters are changed, exchanged and interchanged in the course of circuit development. These meter changes often consume considerable time so that there has existed a need for a device by which a meter may be quickly taken out of the circuit and replaced by another meter.

This invention satisfies the need by providing a mounting device which remains in the circuit, and from which a meter may be removed and another meter of the same type installed without recourse to tools.

This invention will best be understood by referring to the accompanying drawing, in which:

Fig. 1 is a sectional view of a meter and mounting device of this invention;

Fig. 2 is a side elevation of Fig. 1;

Fig. 3 is a sectional view of a modification of Fig. 1;

Fig. 4 is a sectional view of another modification; and

Fig. 5 is a cross-sectional elevation of Fig. 4.

Referring now in detail to Figs. 1 and 2 of the drawing, the meter 1 is shown located on a mounting block 2, which is secured to a base panel 3 at a proper angle to give convenient viewing of the meter scale; such a proper angle being approximately 45°.

Figs. 1 and 2 show the meter 1 as being of the type having two external threaded terminal studs 1A extending from the rear. The studs 1A are usually provided with suitable nuts and washers, which are not shown for the reason that when the meter is used with this invention, such nuts and washers are removed. The mounting block 2 is made of some suitable insulating material, such as Bakelite, and is slotted with lateral slots 5 to accommodate two movable metal contact levers 4, which are recessed to move within the lateral slots 5 on each side of block 2. At the lower portion of slots 5 there are located circular apertures 6, which are drilled to accommodate helical compression springs 7, which are placed beneath the contact levers 4. The levers 4 are pivoted by means of pivots 8, which are so arranged that the upper portions thereof make contact with the terminal studs 1A of meter 1; the block 2 being drilled at 9 to accommodate the meter terminals 1A. The lower ends of the contact levers 4 are provided with suitable insulating buttons 10, and flexible connection leads 11, which are soldered in an aperture 12. The lower portion of block 2 is bevelled at 13 so that when fastened to the panel 3, of wood or other suitable material, it will retain the meter at a convenient angle to be read, preferably in the position as is shown in Fig. 2. The contact levers are preferably arcuately formed at the place of contact with the meter terminals 1A to give a large surface area of contact, and partially threaded to mesh with the threaded meter terminals.

The operation of the device of this invention is as follows:

After connecting the flexible conductors 11 into an electrical circuit in the same usual manner in which a volt-meter or a current meter should be connected, as the case may be, the lower ends of the contact levers 4, which have insulating "buttons" 10 (Fig. 1) are moved by the operator's fingers so as to compress the springs 7, thus rotating about the pivot pins 8 and clearing the holes for the insertion of meter terminals 1A. After the meter terminals have been inserted and the contact levers have been released, the springs will cause the contact levers to press firmly against the meter terminals, giving good electrical contact and holding the meter firmly in place.

If it is desired to remove the meter from the circuit and replace it with another meter of the same type as regards the terminals 1A, it is only necessary for the operator to press the contact levers 4 to release the meter, remove same and insert replacement meter, then release contact levers and the change is made, without the use of tools.

The modification shown in Fig. 3 is somewhat similar to the general arrangement shown in Figs. 1 and 2, except for the omission of the lateral slots 5 and contact levers 4, and in place thereof are provided two push-buttons 21, which are arranged to actuate a metal plunger 22 having an enlarged end contact 23, which makes contact with terminals 1A of meter 1. Contact between the enlarged portion 23 of plunger 22 is maintained by helical extension springs 24, actuating within a tubular metallic housing 25 and bearing against metal washers 26; the housing 25 being retained within an aperture 27 and secured therein by means of screws 28. The connection between terminal studs 1A and the enlarged portion 23 of plunger 22 is maintained by suitable metallic connection means 29, which are located so as to bridge the space therebetween.

In the operation of this device, when the push-buttons 21 are depressed by the operator the electrical contact with the meter is broken, and then it may be removed or replaced by another meter.

Referring now to the other modification shown in Figs. 4 and 5, a single push-button operates against a spring tension member to release the grip and electrical connection on the meter terminals. The main body portion 31 has cut out from the central portion thereof an aperture 32, which contains two pivoted links 33, which are pivoted at the lower portion thereof by pivots 34. The links 33 are positioned intermediate terminals 1A of meter 1 and a central push-button 35, having an enlarged portion 36 of insulation material. Push-button 35 operates in a central aperture 37, the lower portion having an extension member 38 which retains a helical extension spring 39; the extension spring is retained within an aperture 40 in the central portion of member 31. The aperture 32 is closed by means of end plates 41 and 42, which are retained in place by means of flat-head machine screws 43. This modification is operated by depressing push-button 35 against the tension of spring 39. This movement of push-button 35 permits the two links 33 to drop away from the meter terminals, thus releasing the meter and disconnecting the electrical circuit. Electrical connections between links 33 and the connection studs 44 are made by flexible connections 45. The connection members 45 may, if desired, be made of flat spring metal, and thus materially assist in releasing the tension on terminals 1A when push-button 35 is manually depressed.

Although only a few modifications of this invention are shown, it is to be distinctly understood that it should not be limited precisely thereto.

I claim:

1. A meter mounting and connection device comprising an insulating support member having two terminal apertures therein adapted to receive the terminals of the meter, a pair of movable metallic blades each one being pivoted and positioned in a lateral slot located on each side of said insulating support member, which slot extends inward to meet the terminal apertures, spring pressure means retained in an aperture located in each one of the slots to apply pressure on each movable metallic blade, whereby the meter terminals are retained and an electrical connection made thereto by said metallic blades.

2. A meter mounting and connection device comprising an insulating support member having two terminal apertures therein adapted to receive the terminals of the meter, a pair of movable metallic blades each one being pivoted and positioned in a lateral slot located on each side of said insulating support member, which slot extends inward to meet the terminal apertures, helical compression springs retained in an aperture located in each one of the slots to apply pressure on each movable metallic blade whereby the meter terminals are retained and an electrical connection made thereto by said metallic blades, and the meter is released by the compression of said helical compression springs.

3. A meter mounting and connection device comprising an insulating support member having two terminal apertures therein adapted to receive the terminals of the meter, a pair of movable metallic blades each one being pivoted and positioned in a lateral slot located on each side of said insulating support member, which slot extends inward to meet the terminal apertures, an insulating button secured to each metallic blade, spring pressure means retained in an aperture located in each one of the slots to apply pressure on each movable metallic blade, whereby the meter terminals are retained and an electrical connection made thereto by said metallic blades.

4. A meter mounting and connection device comprising an insulation support member having two terminal apertures therein adapted to receive the terminals of the meter, a pair of movable metallic blades each one being pivoted and positioned in a lateral slot located on each side of said insulating support member, which slot extends inward to meet the terminal apertures, spring pressure means retained in an aperture located in each one of the slots to apply pressure on each movable metallic blade whereby the meter terminals are retained and an electrical connection made thereto by said metallic blades, and a flexible connection lead connected to each one of said metallic blades for connecting the meter to an external circuit.

LLOYD L. YOUNG.

REFERENCES CITED

The following references are of record in the file of this patent:

UNITED STATES PATENTS

| Number | Name | Date |
|---|---|---|
| 1,610,304 | Mabie | Dec. 14, 1926 |
| 1,630,592 | Weston | May 31, 1927 |
| 1,660,285 | Weston | Feb. 21, 1928 |
| 1,689,853 | Beede | Oct. 30, 1928 |
| 1,734,220 | MacGahan et al. | Nov. 5, 1929 |
| 2,126,602 | Bakke | Aug. 9, 1938 |
| 1,969,499 | Bradshaw et al. | Aug. 7, 1934 |
| 292,324 | Knowles et al. | Jan. 22, 1884 |
| 1,119,864 | Ovington et al. | Dec. 8, 1914 |
| 1,957,773 | Good | May 8, 1934 |